US011100325B2

(12) United States Patent
Xu et al.

(10) Patent No.: US 11,100,325 B2
(45) Date of Patent: Aug. 24, 2021

(54) PHOTOGRAPHIC RESULTS BY COMPOSITION ANALYSIS USING DEEP LEARNING NEURAL NETWORKS

(71) Applicant: INTERNATIONAL BUSINESS MACHINES CORPORATION, Armonk, NY (US)

(72) Inventors: Chen Hui Xu, Xian (CN); Zhe Yan, Beijing (CN); Bo Wen Wei, Xian (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 209 days.

(21) Appl. No.: 16/213,673

(22) Filed: Dec. 7, 2018

(65) Prior Publication Data
US 2020/0184215 A1    Jun. 11, 2020

(51) Int. Cl.
| | | |
|---|---|---|
| *G06K 9/00* | (2006.01) | |
| *G06K 9/62* | (2006.01) | |
| *H04N 5/232* | (2006.01) | |

(52) U.S. Cl.
CPC ....... *G06K 9/00664* (2013.01); *G06K 9/6256* (2013.01); *G06K 9/6262* (2013.01); *G06K 9/6268* (2013.01); *H04N 5/23222* (2013.01)

(58) Field of Classification Search
CPC ............ G06K 9/00664; G06K 9/6268; G06K 9/6256; G06K 9/6262; G06K 9/03; H04N 5/23222; H04N 5/232939; H04N 5/232935; H04N 5/23225; H04N 5/23219
See application file for complete search history.

(56) References Cited

U.S. PATENT DOCUMENTS

| | | | |
|---|---|---|---|
| 8,781,175 B2 | 7/2014 | Wang et al. | |
| 2015/0269455 A1 | 9/2015 | He et al. | |
| 2017/0208243 A1 | 6/2017 | Masad et al. | |
| 2018/0139623 A1* | 5/2018 | Park | H04B 17/3913 |
| 2019/0174056 A1* | 6/2019 | Jung | H04N 1/00244 |
| 2019/0238759 A1* | 8/2019 | Ahn | G06N 3/08 |
| 2020/0021733 A1* | 1/2020 | Liu | H04N 5/23219 |
| 2020/0125880 A1* | 4/2020 | Wang | G06K 9/4619 |
| 2020/0267313 A1* | 8/2020 | Youn | H04N 5/232945 |

FOREIGN PATENT DOCUMENTS

| | | |
|---|---|---|
| CN | 101637015 | 1/2010 |
| CN | 102063709 | 5/2011 |
| CN | 107257438 | 10/2017 |
| WO | 2015123605 | 8/2015 |

OTHER PUBLICATIONS

Chen et al., "Automatic photographic composition based on Convolutional Neural Network". IEEE Conference Publication, 2017, 3 pages.
Chang et al., "Finding good composition in panoramic scenes". IEEE Conference Publication, 2009, 3 pages.

* cited by examiner

*Primary Examiner* — Mazda Sabouri
(74) *Attorney, Agent, or Firm* — Richard A. Wilhelm (57) ABSTRACT

A method, system and computer program product for improving photographic results by composition analysis using deep-learning neural networks, by: detecting one or more objects in a camera view; classifying the objects to make one or more composition recommendations; and displaying the composition recommendations in the camera view, wherein the camera view is aligned with one of the composition recommendations to take a picture.

18 Claims, 9 Drawing Sheets

PHOTOGRAPHIC RESULTS BY COMPOSITION ANALYSIS USING DEEP LEARNING NEURAL NETWORKS

BACKGROUND

Improving photographic results is important with cameras built into smartphones, due to the user's limited control of the camera. Some issues involved in obtaining good photographic results include composition issues: what is a suitable size and distance for objects in the photo; how best to arrange a position and a location for objects in the photo; how best to adjust the gestures of humans in the photo; etc.

What is needed, then, are methods and systems for improving photographic results by composition analysis. The present invention satisfies this need.

SUMMARY

The invention provided herein has many embodiments useful, for example, in a computer-implemented method, system and computer program product for improving photographic results by composition analysis using deep-learning neural networks, by: detecting one or more objects in a camera view; classifying the objects to make one or more composition recommendations; and displaying the composition recommendations in the camera view, wherein the camera view is aligned with one of the composition recommendations to take a picture.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

The present invention discloses a method and system for improving photographic results by composition analysis using deep-learning neural networks.

Artificial intelligence (AI) is defined broadly as computer-implemented methods and systems for simulating intelligence. A subset of artificial intelligence is machine learning (ML), which uses data to tune algorithms. A subset of machine learning is deep-learning (DL), which uses neural networks to simulate the learning process.

In one embodiment, the functionality of the deep-learning neural networks is provided by the Watson™ services offered by International Business Machines, the assignee of the present invention. However, other deep-learning neural networks could also be used.

In the present invention, the composition analysis utilizes the deep-learning neural networks to automatically perform object detection and classification in order to provide recommendations to a user when taking photos.

In the deep-learning neural networks, models for object detection and classification are trained offline to detect object outlines, types and locations in images, and then to classify the object outlines, in order to make composition recommendations. The result of this training is that deep-learning neural networks can detect and classify objects more accurately, resulting in a higher confidence score for the composition recommendations.

Thereafter, when taking a photo, a current camera view is analyzed online by these models to detect and classify object outlines, types and locations therein, in order to make the composition recommendations. The result is better pictures for users.

In one aspect of the composition recommendations, both distance and size suggestions are made. The ratio of the area or height for an object outline can be calculated and compared to a threshold derived from one or more composition rules. Thus, a judgment is made whether the distance and/or size satisfy the composition rules, or whether the distance and/or size need to be modified (e.g., the object made closer or farther away in the camera view; the object made larger or smaller in the camera view; etc.). When making this judgment, the threshold is automatically adopted according to different object types.

In another aspect of the composition recommendations, both location and gesture suggestions are made. The object outlines are classified as geometric shapes by the models, and the locations of the objects are assessed. The geometric shapes are matched to one or more composition recommendations for the current camera view.

In one embodiment, the composition recommendations are displayed by overlaying the current camera view, so that the user can align the current camera view to match the composition recommendations, in order to obtain a photo with a good composition.

As a result, the present invention provides visual guidance for image composition to the user in real-time that is clear, simple and operational, allowing the user to more easily make adjustments to the image.

Moreover, the present invention can easily be expanded to recognize more types of objects and to include more composition rules.

Cloud Computing Environment

Figure 1:
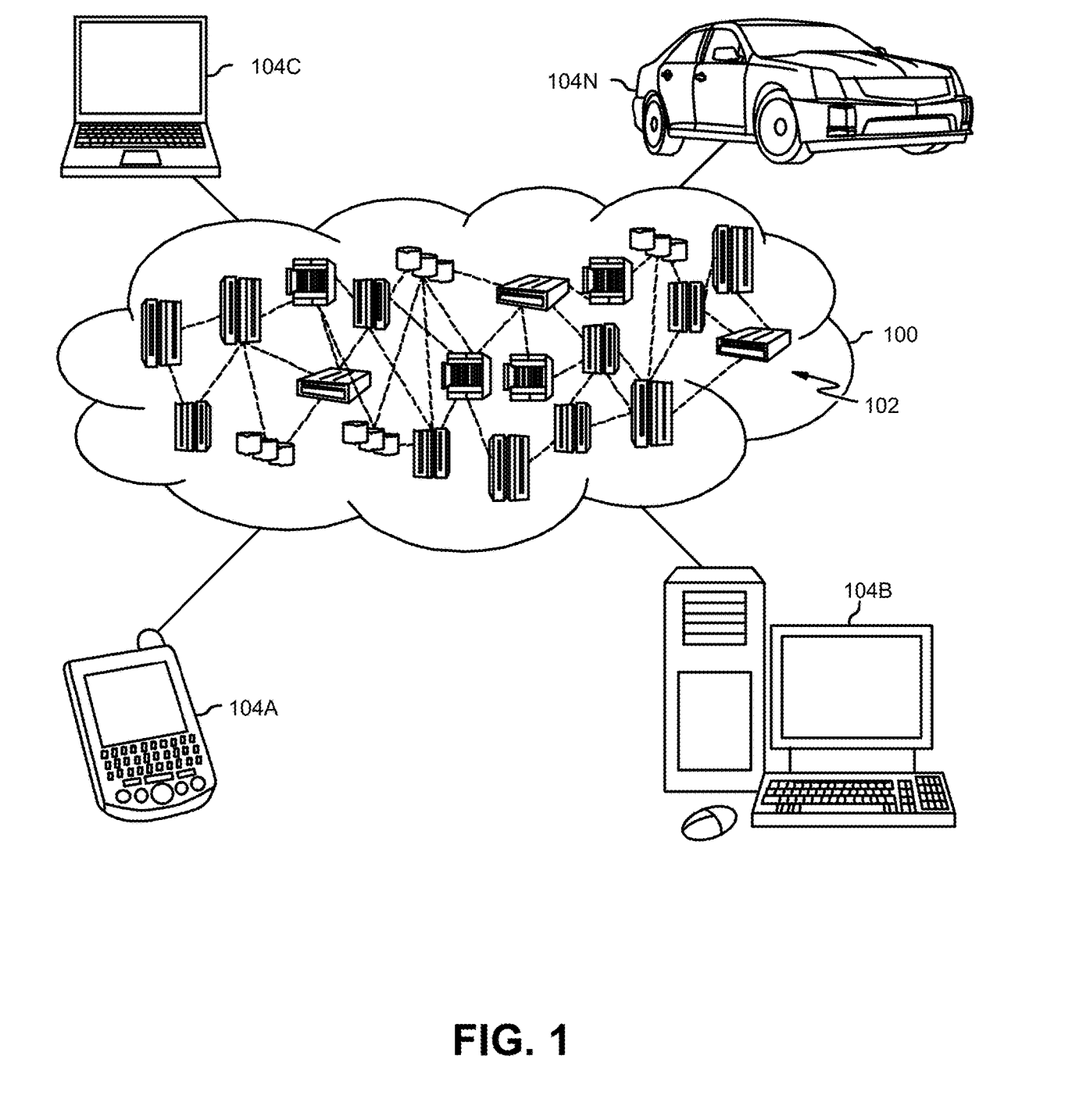
FIG. 1 is a pictorial representation of an illustrative cloud computing environment used for implementing a method and system for improving photographic results by composition analysis using deep-learning neural networks.

FIG. 1 is a pictorial representation of an illustrative cloud computing environment 100 used for implementing a method and system for improving photographic results by composition analysis using deep-learning neural networks, according to one embodiment.

As shown, a cloud computing environment 100 includes one or more cloud computing nodes 102 with which local computing devices used by cloud consumers, such as, for example, personal digital assistant (PDA) or smartphone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

The computing nodes 102 and/or computing devices 104A-N perform various functions and steps as described in more detail below. Although the description refers to an embodiment that uses a smartphone 104A, other embodiments may use the personal digital assistant 104A, desktop computer 104B, laptop computer 104C, and/or automobile computer system 104N, as well as any other computing device 104 that includes a camera and can communicate with the computing nodes 102.

System Description

Figure 2:
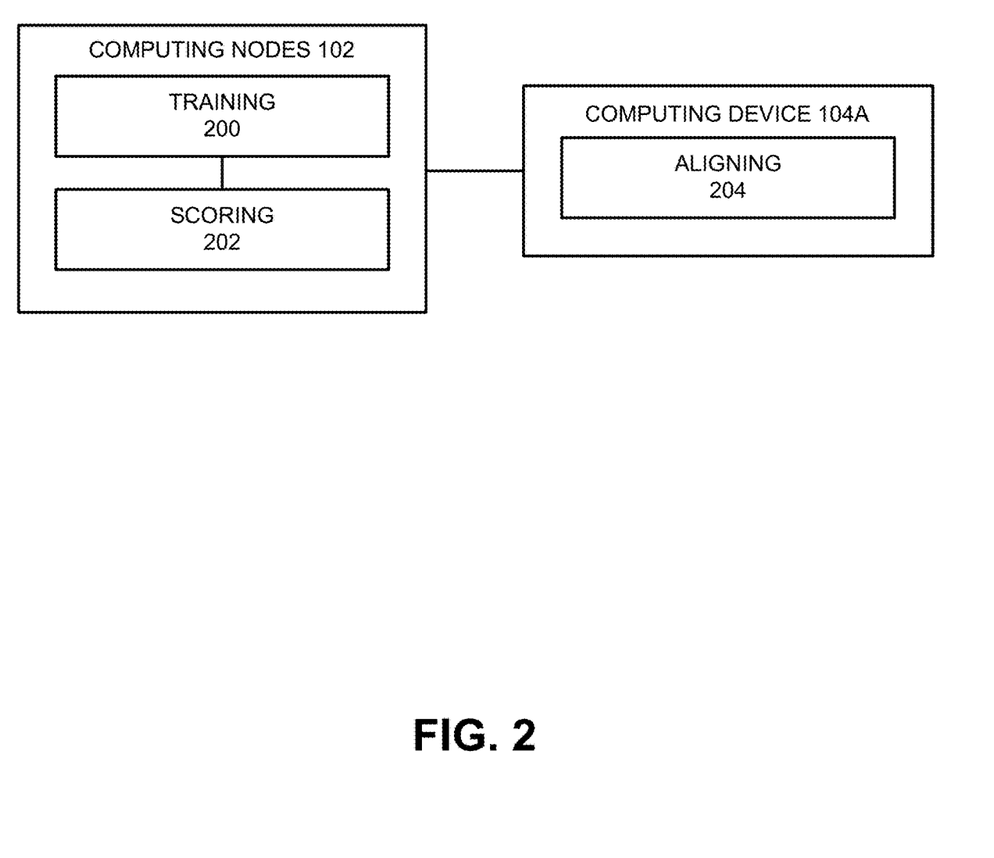
FIG. 2 is a block diagram illustrating how the system and method for improving photographic results by composition analysis using deep-learning neural networks is implemented, according to one embodiment.

FIG. 2 is a block diagram illustrating how the method and system for improving photographic results by composition analysis using deep-learning neural networks are implemented, according to one embodiment. In this embodiment, the method and system are implemented as follows:

the computing nodes 102 implement one or more deep-learning neural networks, wherein the deep-learning neural networks comprise one or more models for detecting and classifying objects in images, and then the computing nodes 102 train the models using offline images;

the user's smartphone 104A sends an image comprising a current camera view of the user's smartphone 104A to the computing nodes 102;

the computing nodes 102 process the image using the models for detecting and classifying objects in images, which results in one or more composition recommendations; and the user's smartphone 104A displays the composition recommendations by overlaying the camera view of the user's smartphone 104A, so that the user can align the camera view to the composition recommendations.

These functions and steps are described in more detail below. In alternative embodiments, these functions and steps may be wholly or partially performed on the computing nodes 102 and/or the user's smartphone 104A.

In a Training step or function 200, the computing nodes 102 perform the step or function of training one or more models of the deep-learning neural networks for detecting and classifying objects in images, including training a first one of the models to detect different sizes and types of objects, and to generate object outlines for the objects; and training a second one of the models to classify the object outlines as representing one or more geometric shapes, and to label the object outlines with a composition type for the geometric shapes. The Training step or function 200 is typically performed offline.

In a Scoring step or function 202, the user's smartphone 104A sends an image comprising a current camera view of the user's smartphone 104A to the computing nodes 102, and the computing nodes 102 perform the step or function of detecting one or more objects in the camera view; and classifying the objects to make one or more composition recommendations. The Scoring step or function 202 is typically performed online.

Detecting the one or more objects in the camera view comprises identifying one or more object outlines, types and locations for the objects in the camera view. Object confirmation is performed by displaying the object outlines overlaying the objects in the camera view of the user's smartphone 104A, wherein a user selects one of the objects and its object outline and the selected object and its object outline becomes a focus of the camera view. Suggestions are provided by the computing nodes 102 to the user's smartphone 104A to make the selected object and its object outline a suitable size in the camera view, after calculating an area or height ratio and/or a suitable range for the selected object and its object outline, wherein the suggestions include distance and size suggestions.

Classifying the objects to make the one or more composition recommendations comprises classifying the one or more object outlines as representing one or more geometric shapes. The composition recommendations are provided by the computing nodes 102 to the user's smartphone 104A and displayed by overlaying the composition recommendations in the camera view of the user's smartphone 104A, so that the camera view can be aligned with one of the composition recommendations, wherein the composition recommendations include one or more geometric shapes and their positions in the camera view. The user either selects the one of the composition recommendations, or the user indicates that the one or more composition recommendations are not satisfactory, and that the camera view should be retaken.

In an Aligning step or function 204, the user's smartphone 104A performs the step or function of aligning the camera view with the selected composition recommendation to take a picture. The camera view is typically aligned with the selected composition recommendation by the user moving or positioning the smartphone 104A itself, to take a picture, although the composition recommendation could be moved or positioned to align with the camera view. The Aligning step or function 204 may be performed online or offline.

These steps and functions 202-204 may be repeated as necessary, and any one or more of the steps and functions 200-204 be omitted as required.

Deep-Learning Neural Networks

Figure 3A:
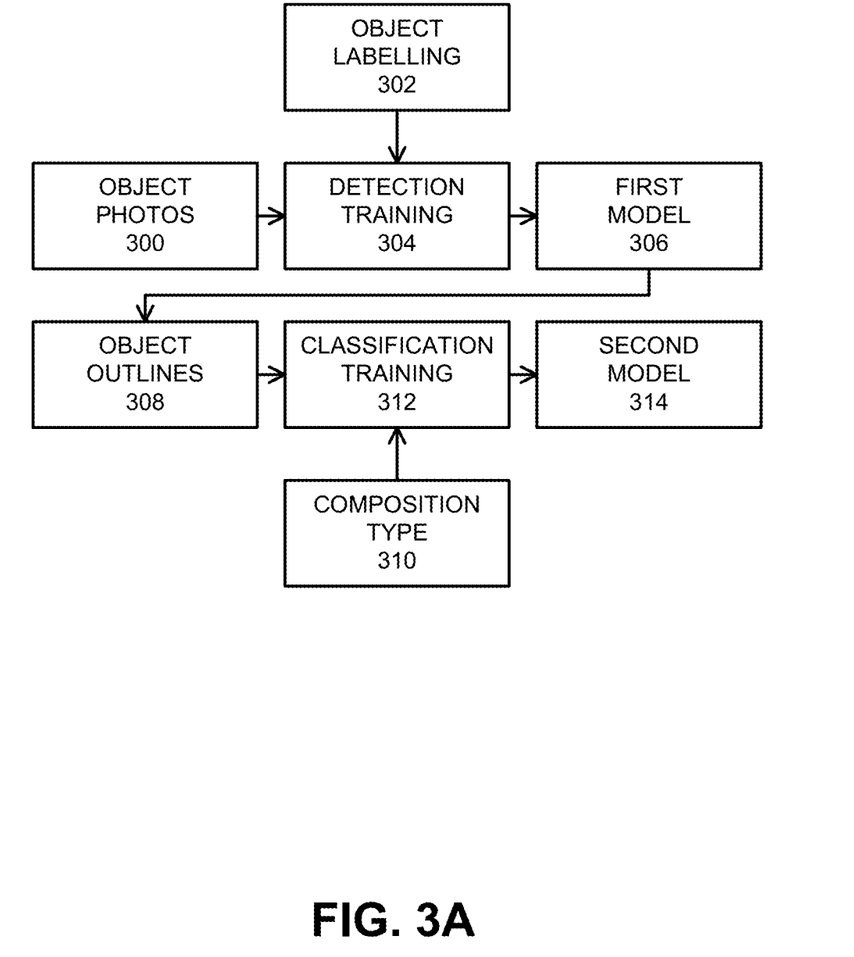
FIGS. 3A and 3B further illustrate how the system and method for improving photographic results by composition analysis using deep-learning neural networks is implemented, according to one embodiment.
Figure 3B:
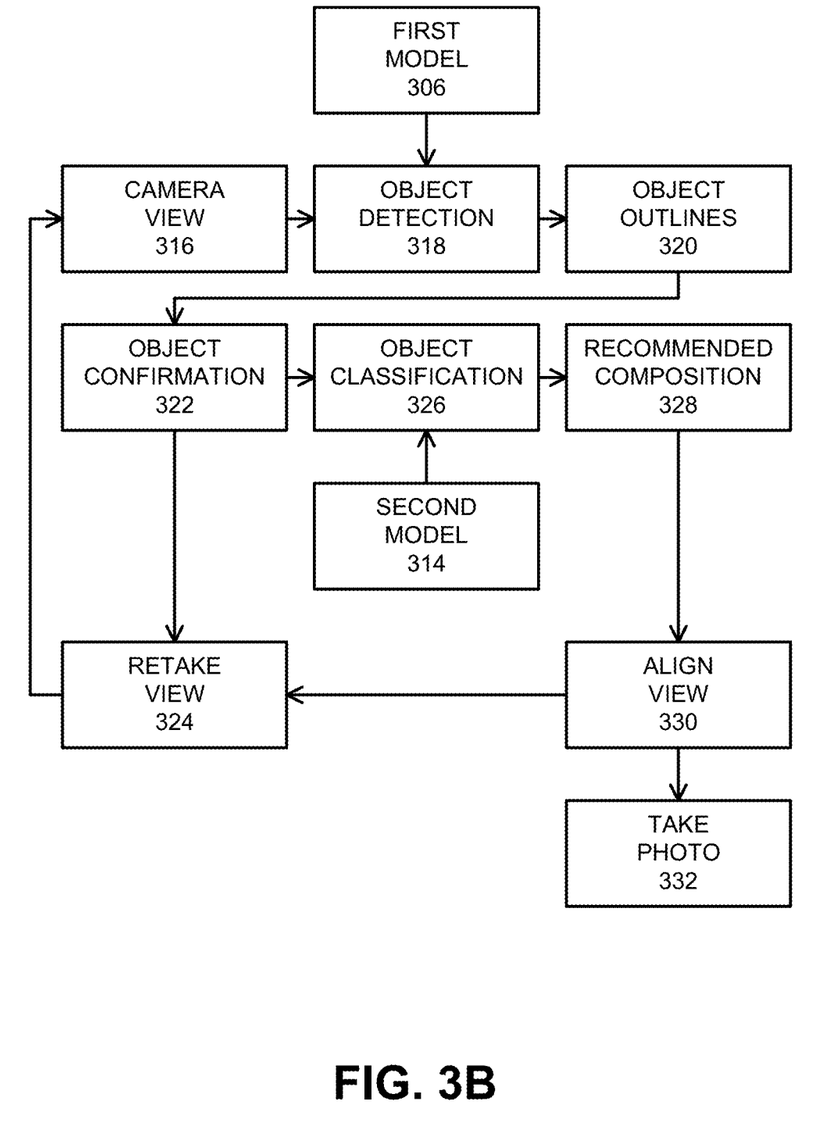

FIGS. 3A and 3B further illustrate how the system and method for improving photographic results by composition analysis using deep-learning neural networks are implemented, according to one embodiment.

1) Training (Step or Function 200)

FIG. 3A further illustrates the Training step or function 200.

Object photos 300 and object labelling 302 are used by the deep-learning neural networks for generating and training 304 a first model 306 for object detection and segmentation. In one example, the object photos 300 comprise photos of human objects, and the object labelling 302 labels each of the objects in the photos 300.

For example, a Mask R-CNN (regional convolutional neural network) may be used, wherein the first model 306 performs object detection by drawing bounding boxes or outlines 308 around each object in the photos 300 that comprises a human object, and the object labelling 302 identifies each object with an outline 308.

The first model 306 may be trained with photos 300 with humans and/or other objects in the photos 300, wherein different sizes and types of humans are shown in the photos 300 (e.g., full-length photo, half-length photo, etc.). Each of these human objects are labelled 302.

The first model 306 is trained to recognize these different sizes and types of humans, and generate the object outlines 308 and label the object outlines 308. Objects in the photos 300 that are not human images, or photos 300 that have no human objects, or photos 300 where the human objects are too small or too big, may be filtered or omitted by the model 306.

The object outlines 308 and composite type labeling 310 are used by the deep-learning neural networks for generating and training 312 a second model 314 for object classification.

For example, the Mask R-CNN (regional convolutional neural network) may be used, wherein the second model 314 performs object classification for each of the object outlines 308.

The second model 314 identifies the object outlines 308 as representing one or more geometric shapes, such as a triangle, rectangle, line, etc. The second model 314 then labels the object outlines 308 with a composition type 310 for the geometric shapes. Additional composition types 310 can be added as desired or required, and the second model 314 can be trained to recognize those additional compositions types 310.

The deep-learning neural networks may use other image processing on the photos 300 and object outlines 308 as well. For example, binary morphology may be used to probe an image with simple, pre-defined shapes, drawing conclusions on whether these shapes are present in the image. In addition, a Hough transform may be used to identify lines and other shapes within the images. Other algorithms also may be adopted to improve the accuracy of the models 306, 314.

2) Scoring (Step or Function 202)

FIG. 3B further illustrates the Scoring step or function 202.

Once trained, the first and second models 306, 314 are used for detecting and classifying objects online in a live, i.e., current, camera view 316 captured by the user's smartphone 104A.

The first model 306 is used to perform online object detection 318 by drawing outlines 320 around each human object detected in the current camera view 316. Because it was trained by the deep-learning neural networks, which performs segmentation in the picture for the objects detected, the first model 306 can accurately obtain object outlines 320 at a pixel level, even in a complex background, along with the type and location of the objects.

Objects that are not human images, or objects where the human image is too small or too large, or for some other reason, may be filtered or omitted by the first model 306 from the current camera view 316.

If no human objects are detected, a message may be displayed to the user, essentially noting that the system is processing the images for human objects.

If one or more human objects are detected in the current camera view 316, then object confirmation 322 is sought from the user by displaying these object outlines 320 overlaying the objects in the current camera view 316.

At this point, the user may indicate that the object detection 318 is not correct or not wanted, and that the current camera view 316 should be retaken 324, with or without new objects in the current camera view 316. If this case, the object detection 318 is repeated with the same or an updated current camera view 316.

Otherwise, the user selects an object and its object outline 320 to indicate that the object detection 318 is correct. The selected object and its object outline 320 becomes the focus of the current camera view 316.

An area and/or height ratio is calculated for the selected object and its object outline 320 compared to the camera view 316. A suitable range for the selected object and its object outline 320 based on the object's type is also defined, per thresholds derived from the composition rules. If the area and/or height ratio is not within the suitable range, then suggestions are provided to zoom the camera's lens or to adjust the object's distance to make the object outline 320 displayed in the current camera view 316 a suitable size. These steps can be repeated until a suitable size is obtained for the selected object and its object outline 320.

Using the selected object and its object outline 320, the second model 314 then performs object classification 326 for the selected object and its object outline 320 to generate one or more composition recommendations 328, each of which include one or more geometric shapes and their positions for the object outline 320.

The composition recommendation 328 is displayed on the user's smartphone 104A, by overlaying the current camera view 316. For example, the composition recommendation 328 may determine a position, orientation and size for displaying the geometric shapes in the current camera view 316, wherein the geometric shapes may be zoomed in or out, or rotated, or otherwise re-positioned, to match the object outline 320 for the human object in the current camera view 316.

The position suggestions may be shape or location dominated. When shape dominated, the location can be changed, but the geometric shapes should be maintained. When location dominated, the geometric shapes can be altered, but the location should be maintained.

If more than one composition recommendation 328 is available for the selected object and its object outline 320, the user can display and select from among the composition recommendations 328. At this point, the user may indicate that the selected composition recommendation 328 is satisfactory.

Alternatively, the user may indicate that the composition recommendations 328 are not satisfactory, and that the current camera view 316 should be retaken 324, with or without new objects in the current camera view 316. If this case, the object detection 318 is repeated with the current camera view 316.

3) Aligning (Step or Function 204)

FIG. 3B also illustrates the Aligning step or function 204.

The user aligns 330 the camera view 316 with the selected composition recommendation 328, repeatedly if necessary, until a satisfactory composition for the camera view 316 is obtained, and the photo taken 332. The aligning step may also include having the object adjust its position and gestures so that it is aligned with the selected composition recommendation.

If the human in the camera view 316 is already in a good position and exhibits the proper gestures, then the camera view 316 should be matched to the selected composition recommendation 328.

If not, the user can adjust the camera view 316 by re-positioning, shifting, zooming, rotating, etc., the camera view 316, or by having the human change their position and/or gestures, to make the human and the geometric shapes displayed by the composition recommendation 328 overlap.

Use Cases

FIGS. 4A, 4B, 4C and 4D illustrate possible use cases for improving photographic results by composition analysis using deep-learning neural networks.

Figure 4A:
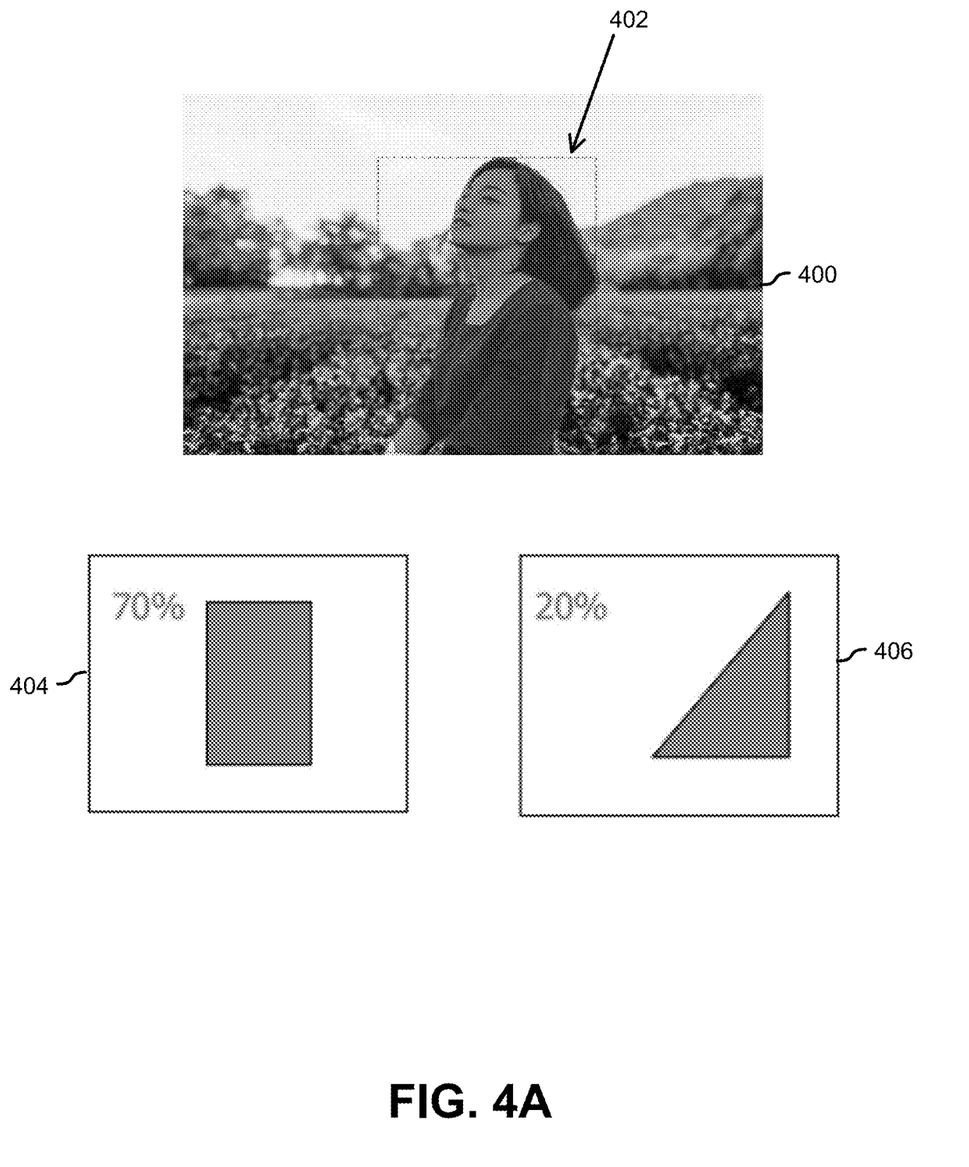
FIGS. 4A, 4B, 4C and 4D illustrate possible use cases for improving photographic results by composition analysis using deep-learning neural networks.

In FIG. 4A, an image 400 is shown, for example, from a current camera view, wherein the first model has performed object detection and drawn an outline 402 around the human object detected in the image. Note that the outline 402 is at the pixel level of the human object. Note also that other objects in the image 400 have been filtered by the first model and are not outlined. Two composition recommendations 404 and 406 are generated by the second model as being most related to the outline 402, with composition recommendation 404 considered to be 70% related and composition recommendation 406 considered to be 20% related. Typically, composition recommendation 404 would be chosen as the most related.

Figure 4B:
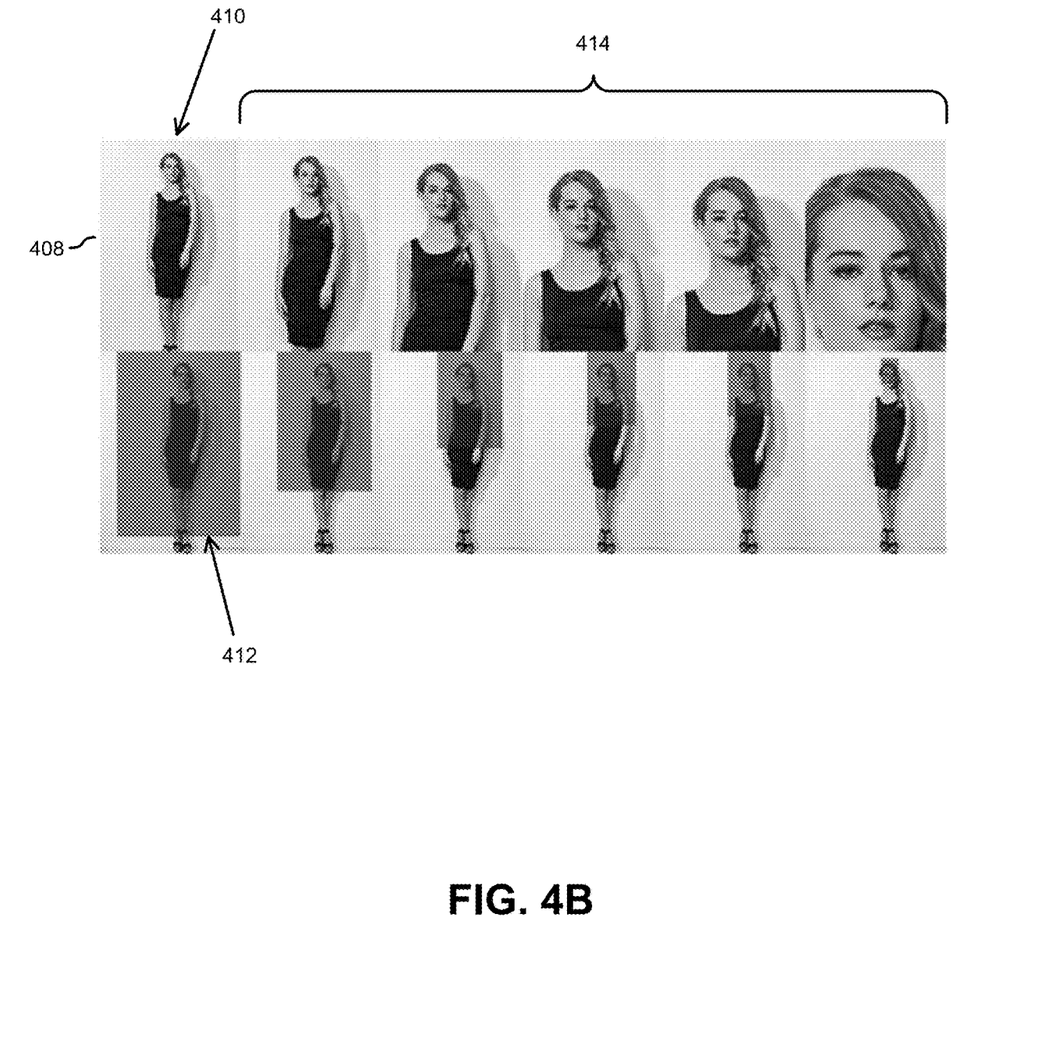

In FIG. 4B, an image 408 is shown, for example, from a current camera view, wherein a human object 410 has been selected as the focus of the camera. In this example, an area and/or height ratio has been calculated for the selected object 410 as compared to the camera view, represented by 412, and multiple suggestions 414 may be provided for zooming the camera's lens to make the selected object 410 a suitable size.

Figure 4C:
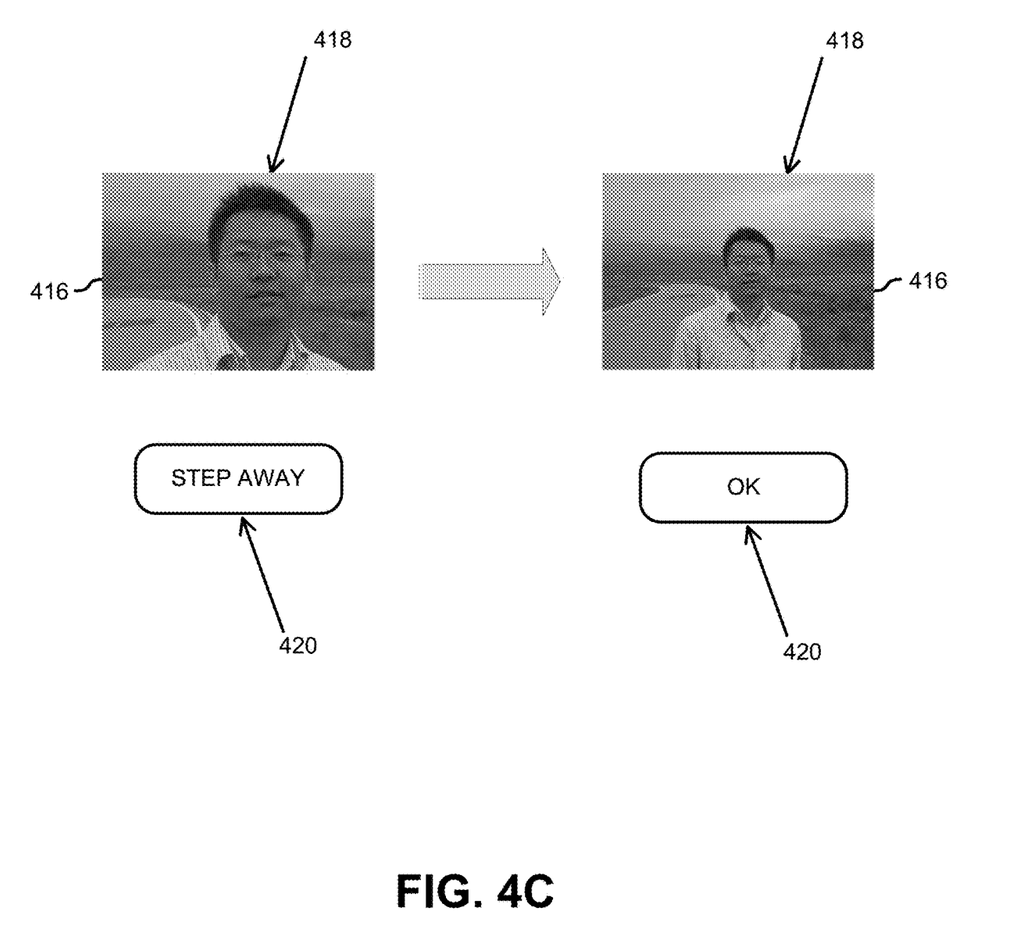

Similarly, in FIG. 4C, an image 416 is shown, for example, from a current camera view, wherein a human object 418 has been selected as the focus of the camera. In this example, an area and/or height ratio has been calculated for the selected object 418 as compared to the camera view, and suggestions 420 are displayed for adjusting the object's 418 distance to make the selected object 418 a suitable size.

Figure 4D:
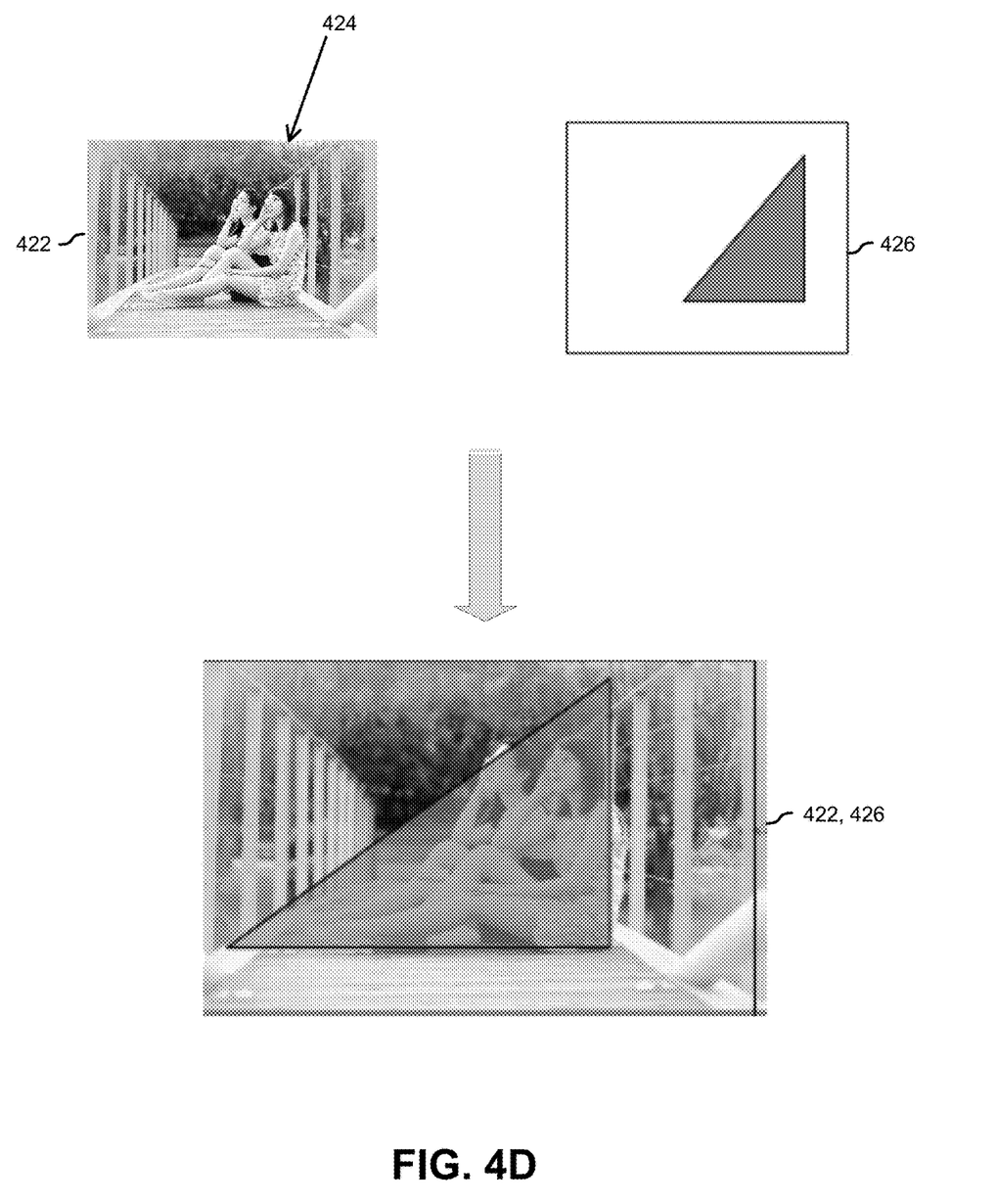

In FIG. 4D, an image 422 is shown, for example, from a current camera view, wherein two human objects 424 have been selected as the focus of the camera. In this example, the second model has performed object classification for the selected objects 424 to generate a composition recommendation 426, which includes a geometric shape (i.e., a triangle) and its position for the selected objects 424. The composition recommendation 426 is then displayed on the user's smartphone 104A, by overlaying the image 422. The user aligns the image 422 with the composition recommendation 426, which results in a satisfactory composition for the camera view being obtained, and the photo taken.

Statutory Subject Matter

It can be seen that the present invention provides a number of benefits and advantages. These benefits and advantages include improvements to the technology or technical field of improving photographic results by composition analysis, and more specifically, for improving photographic results by composition analysis using deep-learning neural networks.

For example, the present invention provides the following benefits and advantages to the technical field:

The present invention can automatically provide composition suggestions based on image analysis for users taking photos.

Using the present invention, no assumptions are made for different types of scenarios, and there is no need to prepare multiple predefined templates for different types of scenarios.

The composition suggestions are visual and overlay the camera view, making it easy for the user to adjust and align the camera view for object sizes, distances, and positions, which makes the present invention more practical and provides a better user experience as compared to other methods.

The present invention has the ability to accurately detect and outline objects in the camera view, and thus minimize the effects of the background on the suggestions.

The present invention utilizes model scoring to perform composition analysis, so complex computations are not needed for the composition analysis when taking a photo.

The present invention can be expanded to include other types of objects (e.g., non-human objects) and additional composition rules, which makes it easy to provide further enhancements.

The benefits and advantages of the present invention also include improvements to the functioning of the devices themselves, including the cloud computing environment 100 generally and the computing nodes 102 specifically, as well as the computing devices 104A-N, as compared to prior computer-implemented methods and systems for improving photographic results. For example, using deep-learning neural networks improves known computer technology using traditional image processing techniques for human outline extraction, such as edge detection.

The benefits and advantages of the present invention are applied to a particular machine, namely, the computing devices 104A-N and/or the computing nodes 102 performing the associated functionality of composition analysis using deep-learning neural networks. Using the present invention, the computing devices 104A-N and/or the computing nodes 102 can benefit from the capabilities of deep-learning neural networks.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or smartphone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 5:
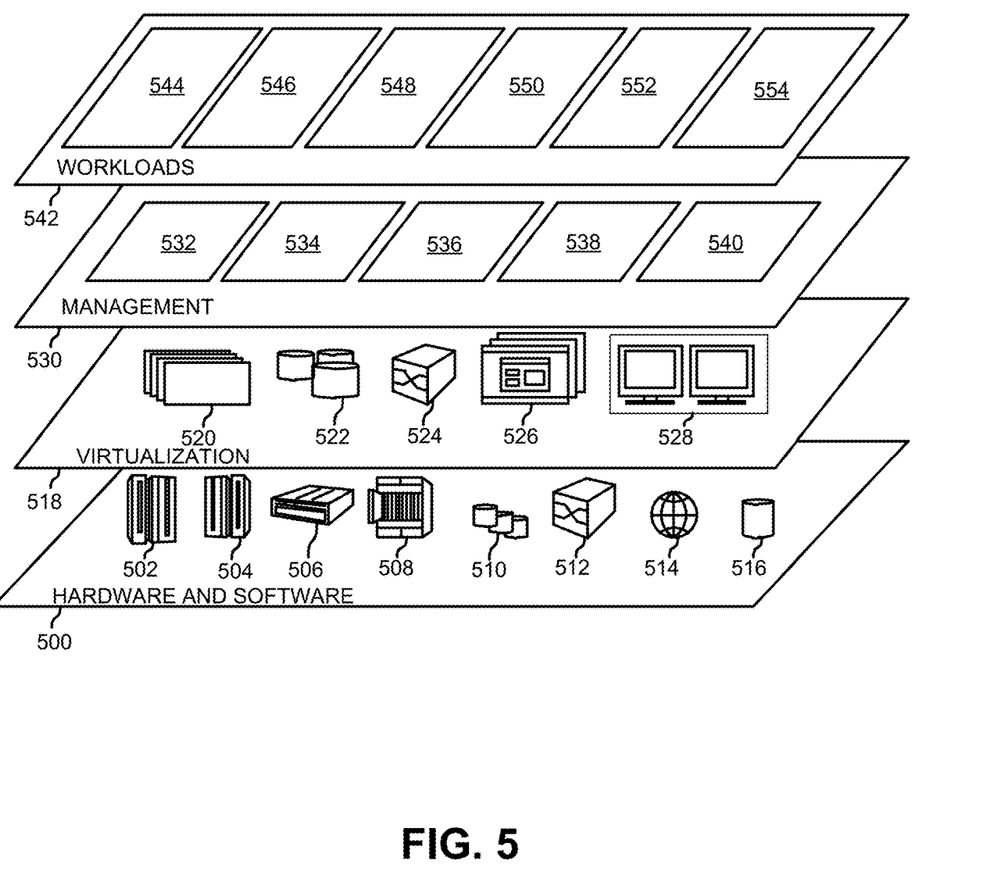
FIG. 5 illustrates a set of functional abstraction layers provided by the cloud computing environment.

Referring now to FIG. 5, a set of functional abstraction layers provided by cloud computing environment 100 (FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: one or more computers such as mainframes 502, RISC (Reduced Instruction Set Computer) architecture based servers 504, servers 506, and blade servers 508; storage devices 510; and networks and networking components 512. In some embodiments, software components include network application server software 514 and database software 516.

Virtualization layer 518 provides an abstraction layer from which the following examples of virtual entities may be provided: virtual servers 520; virtual storage 522; virtual networks 524, including virtual private networks; virtual applications and operating systems 526; and virtual clients 528.

In one example, management layer 530 may provide the functions described above. Resource provisioning 532 provides dynamic procurement of computing resources and other resources that are utilized to perform tasks within the cloud computing environment 100. Metering and pricing 534 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 536 provides access to the cloud computing environment 100 for consumers and system administrators. Service level management 538, which includes containers, provides cloud computing resource allocation and management such that required service levels are met. Service Level Agreement (SLA) planning and fulfillment 540 provide pre-arrangement for, and procurement of, cloud computing resources for which a future requirement is anticipated in accordance with an SLA.

Workloads layer 542 provides examples of functionality for which the cloud computing environment 100 may be utilized. Examples of workloads, tasks and functions which may be provided from this layer include: mapping and navigation 544; software development and lifecycle management 546; virtual classroom education delivery 548; data analytics processing 550; transaction processing 552; etc. More specifically, this layer includes the workloads, tasks and functions for improving photographic results by composition analysis using deep-learning neural networks, as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising:
   improving photographic results by composition analysis using deep-learning neural networks, by:
     detecting one or more objects in a camera view, wherein the detecting the one or more objects in the camera view comprises identifying one or more object outlines for the objects in the camera view;
     classifying the objects to make one or more composition recommendations, wherein the classifying the objects to make the one or more composition recommendations includes classifying the one or more object outlines as representing two or more geometric shapes, the two or more geometric shapes including a triangular shape; and
     displaying the composition recommendations in the camera view and performing object confirmation by displaying the object outlines overlaying the objects in the camera view, wherein a user selects an object and its object outline, and wherein the camera view is aligned with one of the composition recommendations to take a picture.

2. The method of claim 1, further comprising training one or more models of the deep-learning neural networks for detecting and classifying objects in images.

3. The method of claim 2, further comprising training a first one of the models to detect different sizes and types of objects, and to generate object outlines for the objects.

4. The method of claim 3, further comprising training a second one of the models to classify the object outlines as representing one or more geometric shapes, and to label the object outlines with a composition type for the geometric shapes.

5. The method of claim 1, wherein detecting the one or more objects in the camera view comprises identifying types and locations for the objects in the camera view.

6. The method of claim 1, wherein the selected object and its object outline becomes a focus of the camera view.

7. The method of claim 6, further comprising providing suggestions to the user to make the selected object and its object outline a suitable size in the camera view, after calculating an area or height ratio and a suitable range for the selected object and its object outline.

8. The method of claim 7, wherein the suggestions include distance and size suggestions.

9. The method of claim 1, wherein the composition recommendations are displayed by overlaying the camera view, so that the camera view can be aligned with one of the composition recommendations.

10. The method of claim 9, wherein the composition recommendations include a geometric shape and its position in the camera view.

11. The method of claim 9, wherein the user selects the one of the composition recommendations.

12. The method of claim 9, wherein the user indicates that the one or more composition recommendations are not satisfactory, and that the camera view should be retaken.

13. The method of claim 1, wherein the user aligns the camera view with one of the composition recommendations to take a picture.

14. A computer-implemented system, comprising:
    one or more computers programmed for improving photographic results by composition analysis using deep-learning neural networks, by:
      detecting one or more objects in a camera view, wherein the detecting the one or more objects in the camera view comprises identifying one or more object outlines for the objects in the camera view;
      classifying the objects to make one or more composition recommendations, wherein the classifying the objects to make the one or more composition recommendations includes classifying the one or more object outlines as representing two or more geometric shapes, the two or more geometric shapes including a triangular shape; and
      displaying the composition recommendations in the camera view and performing object confirmation by displaying the object outlines overlaying the objects in the camera view, wherein a user selects an object and its object outline, and wherein the camera view is aligned with one of the composition recommendations to take a picture.

15. The system of claim 14, further comprising training one or more models of the deep-learning neural networks for detecting and classifying objects in images, including training a first one of the models to detect different sizes and types of objects, and to generate object outlines for the objects, and training a second one of the models to classify the object outlines as representing one or more geometric shapes, and to label the object outlines with a composition type for the geometric shapes.

16. The system of claim 14, wherein detecting the one or more objects in the camera view comprises:
    identifying types and locations for the objects in the camera view;
    wherein the selected object and its object outline becomes a focus of the camera view; and
    providing suggestions to the user to make the selected object and its object outline a suitable size in the camera view, after calculating an area or height ratio and a suitable range for the selected object and its object outline, wherein the suggestions include distance and size suggestions.

17. The system of claim 14, wherein classifying the objects to make the one or more composition recommendations comprises:
    classifying the one or more object outlines as representing two or more geometric shapes, wherein the composition recommendations are displayed by overlaying the camera view, so that the camera view can be aligned with one of the composition recommendations, wherein the composition recommendations include a geometric shape and its position in the camera view, and wherein the user selects the one of the composition recommendations.

18. A computer program product, the computer program product comprising a computer readable storage medium having program instructions embodied therewith, the program instructions executable by one or more computers to cause the computers to perform a method, comprising:

improving photographic results by composition analysis using deep-learning neural networks, by:

detecting one or more objects in a camera view, wherein the detecting the one or more objects in the camera view comprises identifying one or more object outlines for the objects in the camera view;

classifying the objects to make one or more composition recommendations, wherein the classifying the objects to make the one or more composition recommendations includes classifying the one or more object outlines as representing two or more geometric shapes, the two or more geometric shapes including a triangular shape; and displaying the composition recommendations in the camera view and performing object confirmation by displaying the object outlines overlaying the objects in the camera view, wherein a user selects an object and its object outline, and wherein the camera view is aligned with one of the composition recommendations to take a picture.

* * * * *